United States Patent [19]

Belart et al.

[11] Patent Number: 4,753,074
[45] Date of Patent: Jun. 28, 1988

[54] BRAKING PRESSURE GENERATOR FOR AN AUTOMOTIVE VEHICLE'S HYDRAULIC BRAKE SYSTEM

[75] Inventors: Juan Belart, Walldorf, Spain; Wolfram Seibert, Pfungstadt, Fed. Rep. of Germany; Norbert Ocvirk, Offenbach, Fed. Rep. of Germany; Juergen Schonlau, Niedernhausen, Fed. Rep. of Germany; Guenter Trach, Offenbach, Fed. Rep. of Germany

[73] Assignee: Alfred Teves GmbH, Frankfurt am Main, Fed. Rep. of Germany

[21] Appl. No.: 927,818

[22] Filed: Nov. 6, 1986

[30] Foreign Application Priority Data

Nov. 6, 1985 [DE] Fed. Rep. of Germany ....... 3539277

[51] Int. Cl.[4] .............................. B60T 8/02
[52] U.S. Cl. .................................. 60/548; 303/114
[58] Field of Search ................ 60/548; 303/114, 119, 303/113, 115

[56] References Cited

U.S. PATENT DOCUMENTS

| | | |
|---|---|---|
| 4,225,022 | 9/1980 | Belart . |
| 4,244,185 | 1/1981 | Belart . |
| 4,440,454 | 4/1984 | Belart .............................. 303/114 |
| 4,555,144 | 11/1985 | Belart .............................. 303/114 X |
| 4,634,190 | 1/1987 | Wupper . |
| 4,641,895 | 2/1987 | Belart .............................. 303/114 X |

FOREIGN PATENT DOCUMENTS

| | | |
|---|---|---|
| 2734551 | 2/1979 | Fed. Rep. of Germany . |
| 2744408 | 4/1979 | Fed. Rep. of Germany . |
| 3240404 | 5/1984 | Fed. Rep. of Germany . |

Primary Examiner—Alan Cohan
Attorney, Agent, or Firm—James B. Raden; Robert P. Seitter

[57] ABSTRACT

A braking pressure generator consists of a hydraulic brake booster (2) actuatable by a brake pedal (16) and of a master brake cylinder (1) whose master cylinder piston (19) is actuatable by a booster piston (14) pressurizable with an auxiliary hydraulic pressure. The booster piston (14) is guided sealedly and axially displaceably in the bore of an annular secondary cylinder piston (41) which, with a front face (52), confines the booster chamber (13) and which, with its stepped surface area (51), confines a secondary cylinder chamber (44) communicating with a pressure chamber (22) of the master brake cylinder (1) via a pressure line (46). In the brake actuating direction, the secondary cylinder piston (41) is supported at a stop ring (48) of a connecting rod (20) between the booster piston (14) and the master cylinder piston (19). In case of an auxilary-pressure-assisted brake application the secondary cylinder piston (41) supplies pressure medium into the pressure chamber (22), thus a smaller actuating travel resulting at the brake pedal (16). If the auxiliary pressure is lacking upon a brake application, the secondary cylinder piston (41) will remain in its rest position and a sufficient braking action will be achievable by means of the master cylinder piston (19) smaller surface actuated alone.

6 Claims, 1 Drawing Sheet

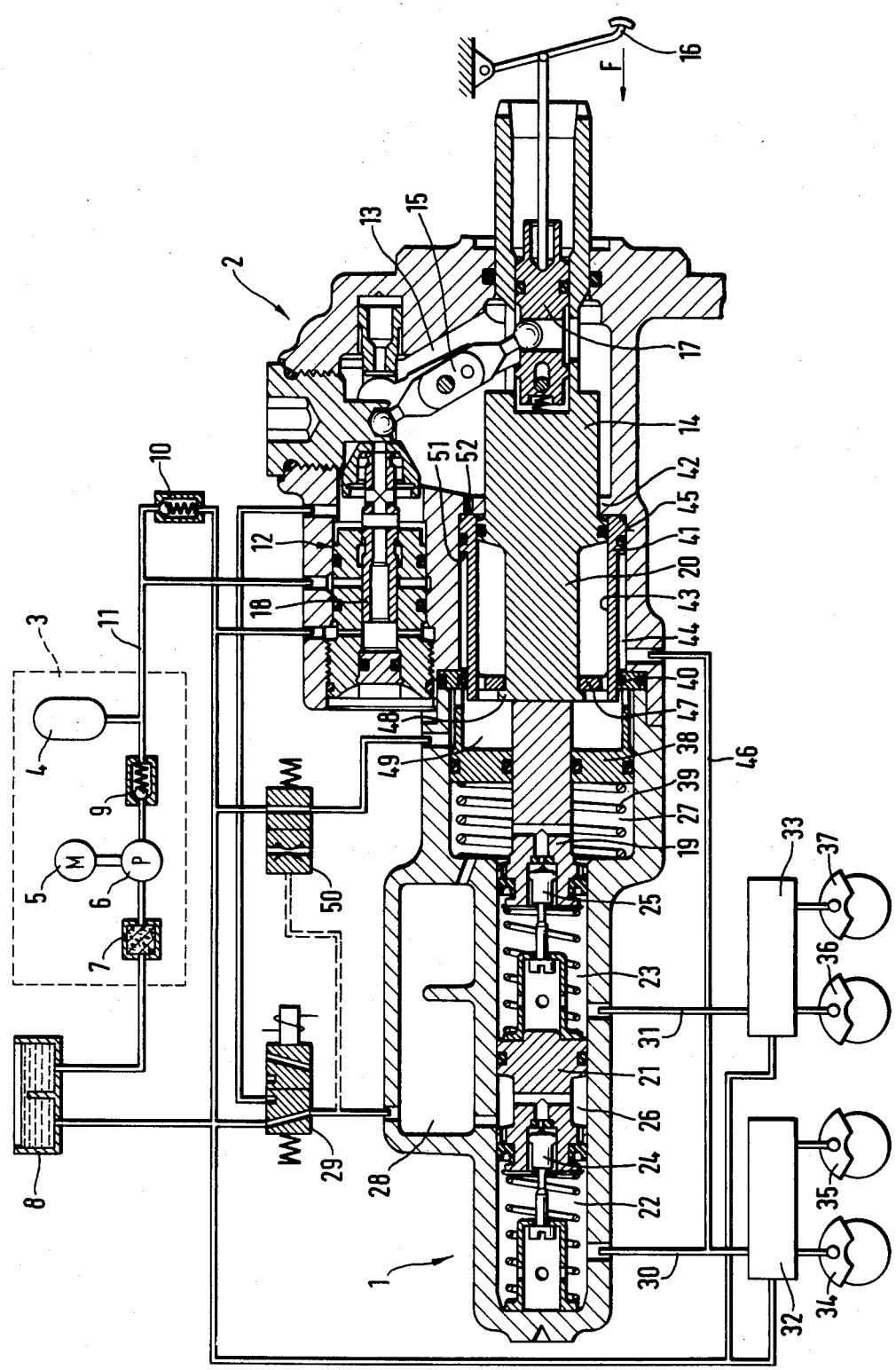

BRAKING PRESSURE GENERATOR FOR AN AUTOMOTIVE VEHICLE'S HYDRAULIC BRAKE SYSTEM

BACKGROUND OF THE INVENTION

This invention relates to a braking pressure generator for an automotive vehicle hydraulic brake system with a booster piston to actuate a master brake cylinder. The booster piston is pressurizable by an auxiliary hydraulic pressure in a booster chamber, and a pedal actuation device cooperates with the booster piston by way of a valve device cooperates with the booster piston by way of a valve device for the control of the auxiliary pressure. A secondary cylinder chamber communicates with a working chamber of the master brake cylinder, and a hydraulically actuatable secondary cylinder piston is movable into the secondary cylinder chamber.

In a braking pressure generator disclosed in German patent application No. P 35 08 709.9 published Sept. 18, 1986 (corresponding to U.S. application Ser. No. 838,687 filed Mar. 12, 1986) a filling stage cylinder is provided for the formation of the secondary cylinder chamber. The two-stage cylinder of the filling stage cylinder is pressurizable by pressure medium displaced by the booster piston upon the booster piston plunging into an annular chamber arranged between the master cylinder and the brake booster. In this arrangement, the annular chamber communicates with the filling stage cylinder by way of a pressure line which may be connected to the supply reservoir by a valve operable by the pressure in the booster chamber. This connection is brought about when the pressure in the booster chamber drops below a predetermined value. In this way the filling stage cylinder will be actuated by the pressure medium displaced out of the annular chamber only when the required boosting pressure is available in the booster chamber. If these is a failure of the boosting pressure due to some trouble and if the braking pressure required for the brake application exclusively has to be generated by the foot pressure acting on the brake pedal, the filling stage cylinder will remain unoperated and the pressure medium displaced out of the annular chamber will flow to the supply reservoir, unpressurized. Thus, the filling stage cylinder will effective only in case of a brake application assisted by the boosted pressure, while in the event of failure of the boosting pressure the braking pressure will be generated by means of the master brake cylinder alone while accepting a larger pedal travel. This known braking pressure generator is very expensive and intricate. It further is disadvantageous in that the actuation of the filling stage cylinder depends on the operation of a valve.

A braking pressure generator is known (German patent application No. P 34 28 136.3 published Feb. 13, 1986 and corresponding to U.S. application Ser. No. 758,306 filed July 24, 1985) which comprises a power booster and master brake cylinder where, on the side facing the master brake cylinder, the booster piston has a smaller diameter portion confining a secondary cylinder chamber designed as annular chamber and reduced in size by the movement of the booster piston upon the application of the brake. The secondary cylinder chamber is connected to a valve which is controllable by the auxiliary pressure of the hydraulic power booster and which in case of lacking auxiliary pressure serves to connect the secondary cylinder chamber with an unpressurized supply reservoir and which in case of existing auxiliary pressure serves to connect the secondary cylinder chamber with a working chamber of the master cylinder. This known braking pressure generator also is expensive and intricate as a hydraulically actuatable valve with a complicated structure in required for the connection of the secondary cylinder chamber. Further, it has proved to be a disadvantage that, when connecting the secondary cylinder chamber with the working chamber of the master brake cylinder, a pressure surge will ensue which will be felt at the brake pedal and which will ensure when different pressures are prevailing in the working chamber and in the secondary cylinder chamber at the moment of connection.

It is thus an object of this invention to provide a braking pressure generator of the type referred to above which is particularly simple and reliable and which avoids pressure surges which might be felt at the brake pedal.

SUMMARY OF THE INVENTION

According to the present invention this object is achieved in that, on its side averted from the secondary cylinder chamber, the secondary cylinder piston is permanently pressurized by the pressure in the booster chamber and in that, in the brake direction of actuation, the secondary cylinder piston is supported at the booster piston. In such a braking pressure generator the secondary cylinder piston forms a displaceable partition wall between the working chamber of the master brake cylinder and the booster chamber. The partition wall is movable only jointly with the booster piston in the direction of actuation when the auxiliary pressure generated in the booster chamber is sufficient to overcome the pressure prevailing in the working chamber of the master brake cylinder and acting on the second cylinder piston. In case of a sufficient auxiliary pressure thus the secondary cylinder piston, together with the booster piston and the master cylinder piston, forms an operational unit to generate the required braking pressure. If, upon a brake application, the auxiliary pressure is too small the secondary cylinder piston will remain in its initial position and the required braking pressure will exclusively be generated by means of the master cylinder piston.

Thus, by means of the present invention a particularly simple design of a braking pressure generator is achieved as no valves are needed for controlling the pressurization of the secondary cylinder piston or for separating the secondary cylinder chamber from the working chamber of the master brake cylinder. Accordingly, even faulty switching of the valves cannot impair the operation of the braking pressure generator, thus also an improvement being achieved in the operational reliability of the inventive braking pressure generator. Because of the permanent pressurization of the secondary cylinder piston with the pressures in the booster chamber and in the working chamber of the master brake cylinder pressure surges will be avoided because the secondary cylinder piston will balance any pressure differences by means of its movement and there will not be any sudden connection of chambers wherein different pressures are prevailing.

A particularly advantageous embodiment of the braking pressure generator can be reached by a further development in that the secondary cylinder chamber is arranged between the booster chamber and the master brake cylinder and in that the secondary cylinder piston has the design of an annular piston surrounding a connecting rod connecting the booster piston with the master cylinder piston. Thereby an easily manufacturable spatial arrangement is provided and the support of the secondary cylinder piston at respectively the booster piston or master cylinder piston can be achieved by easily manufacturable means. Preferably the connecting rod has a stop ring against which a radial butt collar of the secondary cylinder piston comes to rest in the brake's direction of application.

A further simplification of the braking pressure generator may be achieved according to the present invention in that, with its annular front face, the secondary cylinder piston confines the booster chamber and in that the booster piston is sealed in the bore of the secondary cylinder piston by means of a slide ring sealing. This further development has the further advantage that it enables a small axial constructional length of the braking pressure generator. In an expedient embodiment the secondary cylinder piston has a stepped surface area and, together with a stepped bore in the booster housing, it forms the secondary cylinder chamber.

The braking pressure generator in accordance with the present invention is likewise suitable for brake systems with a brake slip control device. So as to ensure an emergency operation in such a brake system upon a failure of the brake slip control device according to a further application of this invention the supply chamber of the master brake cylinder may be closed by an axially displaceable positioning piston which annularly surrounds the master cylinder piston end facing the booster piston. In case of pressurization of the supply chamber with the auxiliary pressure, the piston be brought into abutment against the booster piston and the secondary cylinder piston in order to move the same in the brake direction of release into a ready position.

BRIEF DESCRIPTION OF THE DRAWING

This invention will be explained in mored detail in the following, reference being made to one embodiment represented in the single FIGURE of the drawing.

DETAILED DESCRIPTION

The drawing shows a longitudinal section through a braking pressure generator in accordance with the present invention connected to a schematically illustrated brake system containing a brake slip control device.

The braking pressure generator illustrated in the drawing comprises master brake cylinder 1 and a hydraulic brake booster 2 which form a structural unit. The brake booster 2 is connected to a hydraulic energy supply system 3 comprising a pressure accumulator 4 charged by a pump 6 driven by an electric motor 5. A line leads from the suction side of the pump 6 to an unpressurized supply reservoir 8 by way of a pressure medium filter 7. On the delivery side of the pump 6 a non-return valve 9 is provided which prevents the pressure medium from flowing back. A pressure relief valve 10 at the outlet 11 of the pressure accumulator 4 prevents the boost pressure from exceeding a predetermined pressure level and diverts superfluous pressure medium to the reservoir 8.

The brake booster 2 has a brake valve 12 connected to the outlet 11 of the pressure accumulator 4, the reservoir 8 and to a booster chamber 13. The brake valve 12 is arranged in parallel with a booster piston 14 and is actuated by a scissor-type lever 15 supported in a pivoting manner in the booster chamber 13 and transmitting a relative movement between an actuating element 17 connected with a brake pedal 16 and the booster piston 14 to a control slide 18 of the brake valve 12. The mode of operation of the brake booster 2 is such as to enable that, upon actuation of the brake pedal 16 by means of a force F, an auxiliary pressure is built up in the booster chamber 13, the auxiliary pressure is proportional to the amount of the force F.

The brake cylinder 1 has the form of a tandem master cylinder with two separate brake circuits. The master brake cylinder 1 has a push-rod piston 19 connected with the booster piston 14 via a connecting rod 20. A floating piston 21 subdivides the working chamber of the master brake cylinder 1 into two pressure chambers 22, 23 separated from each other and communicating with supply chambers 26, 27 by way of central valves 24, 25 in the push-rod piston 19 and in the floating piston 21, the central valves 24, 25 being open in the illustrated initial position. The supply chambers 26, 27 communicate with separate chambers of a supply reservoir 28 connected to the reservoir 8 by way of a valve passage of an electromagnetically operable ⅜-way valve 29, the valve passage being open in the illustrated initial position. Brake lines 30, 31 lead from the two pressure chambers 22, 23 to braking pressure modulators 32, 33. Connected to the modulators are the wheel brakes 34, 35 of the front axle of a vehicle and the wheel brakes 36, 37 of the rear axle of a vehicle. The braking pressure modulators 32, 33 as well as the ⅜-way valve 29 are controlled by a non-illustrated brake slip control device which prevents the wheel brakes from locking. In their initial positions, the braking pressure modulators 32, 33 have a free passage from the brake lines 30, 31 to the wheel brakes 34 through 37.

The supply chamber 27 of the master brake cylinder 1 is closed towards the brake booster 2 by means of a cup-shaped positioning piston 38 which, in the direction of actuation, is displaceable against the force of a compression spring 39 and throught the bottom of which the push-rod piston 19 is guided in a pressure-sealed manner. The positioning piston 38 rests at an annular disk 40 arranged in the front wall of the brake booster 2.

Between the master brake cylinder 1 and the booster chamber 13 a secondary cylinder piston 41 is axially displaceably arranged in the brake booster 2. The secondary cylinder piston 41 annularly surrounds the connecting rod 20 and the booster piston 14 and rests the brake release direction at an annular collar 42, in the annular collar 42 the booster piston 14 being displaceably guided. With its surface area, the booster piston 14 engages the cylindrical bore 43 of the secondary cylinder piston 41 and is sealed relative to the bore wall by means of a slide ring sealing. By means of its stepped surface the secondary cylinder piston 41 confines a secondary cylinder chamber 44, its smaller diameter portion being guided in a pressure-sealed and displaceable manner in the annular disk 40 and its larger diameter portion being guided in a pressure-sealed and displaceable manner in a bore 45 of the brake booster 2. The secondary cylinder chamber 44 communicates with the pressure chamber 22 by way of a pressure line 46. The secondary cylinder piston 41 has a butt collar 47 at its front face facing the master brake cylinder By means of said butt collar 47, the secondary cylinder piston 41 is supported in the brake's release direction at a stop ring 48 at the connecting rod 20.

The chamber 49 confined by the positioning piston 38, the booster piston 14 and the secondary cylinder piston 41 communicates with the reservoir 8 via a throttle valve 50 which is open in its initial position.

In the following, the mode of operation of the described braking pressure generator will be explained in more detail, starting from the brake release position in which the master brake cylinder 1, the brake booster 2 as well as the ⅜-way valve 29 and the throttle valve 50 adopt the positions illustrated in the drawing.

By actuating the brake pedal 16 by means of a force F at first the control slide 18 of the brake valve 12 will be displaced and pressure medium will be supplied from the energy supply system 3 into the booster chamber 13. The pressure thereby increasing in the booster chamber 13 will pressurize the booster piston 14 and the secondary cylinder piston 41 and will displace them in the brake direction of actuation. Thereby, by way of the connecting rod 20, the push-rod piston 19 and the floating piston 21 supported at the push-rod piston 19 by way of a prestressed return spring will likewise be actuated and the central valves 24, 25 will be closed. Thus a pressure may build up in the pressure chambers 22, 23, said pressure reaching the wheel brakes 34 through 37 by way of the brake lines 30, 31 and the braking pressure modulators 32, 33 and generating a braking force at the wheel brakes.

In this phase of the braking operation the actuating pressure effective at the wheel brakes will be controlled by the brake valve 12 in correspondence with the actuating force F exerted at the brake pedal 16. In doing so, the pressure in the master brake cylinder 1 will be generated both by the push-rod piston 19, actuated by the booster piston 14, and by the second cylinder piston 41 which, by means of its stepped surface, displaces pressure medium out of the secondary cylinder chamber 44 and, by way of the pressure line 46, displaces it respectively into the pressure chamber 22 and into the wheel brakes 34, 35 connected to the pressure chamber 22. Thus, part of the pressure medium volume required for the actuation of the wheel brakes will be supplied from the secondary cylinder chamber 44 so that the actuating travel of the push-rod piston 19 will remain correspondingly smaller. The effective surface of the master brake cylinder 1 thus (in this phase of actuation) will correspond to the sum of the effective surfaces of push-rod piston 19 and secondary cylinder piston 41. Due to the support at the connecting rod 20 the actuating movement of the secondary cylinder piston 41 will be adapted to the actuating movement of the push-rod piston 19. Further, the pressure forces caused at the secondary cylinder piston 41 by the auxiliary pressure in the booster chamber 13 and surpassing the pressure forces generated by the pressure in the secondary cylinder chamber 44 will be transmitted to the connecting rod 20 and thus to the push-rod piston 19. Thus, the sum of the auxiliary-pressure-applied effective surfaces of the booster piston 14 and of the secondary cylinder piston 41 will be available without any losses for the generation of the braking pressure in the master brake cylinder 1.

In the described example of an embodiment the effective surface 51 of the secondary cylinder piston 41 in the secondary cylinder chamber 44 is smaller than its front face 52 pressurized by the auxiliary pressure. Therefore, the power booster may be related such as to ensure that the auxiliary pressure in each case will equal the braking pressure generated in the master brake cylinder 1 or will even be lower than said braking pressure. However, the secondary cylinder piston 41 may also have design according to which the effective surface 51 will equal or exceed the effective surface 52 in size, the brake booster 2 being rated such as to ensure that in each case the auxiliary pressure will surpass the braking pressure in the master brake cylinder 1.

If it is impossible to build up any auxiliary pressure in the brake booster 2 because of a failure of, for instance, the energy supply system 3 the brake may be actuated by means of the foot pressure F alone by displacing the booster piston 14, the connecting rod 20 and the push-rod piston 19. In order to generated the required braking pressure, in this case, only the effective surface of the push-rod piston 19 will be effective as the secondary cylinder piston 41 will remain in the initial position shown in the drawing. In this way, it will be possible to generate the actuating pressure in the master brake cylinder 1, which is required to achieve the prescribed minimum braking action, only by means of the foot pressure F even without the assistance by the brake booster 2. However, there will result a larger actuating travel at the brake pedal 16. In this operating condition, the braking pressure generated in the master brake cylinder 1 also will be active in the secondary cylinder chamber 44. This, however, will not be disadvantageous as the secondary cylinder 41 will support itself in the brake release direction at the annular collar 42, thus being unable to carry out any movement. In case of the increased actuating travel the positioning piston 38 will be moved beyond the stop ring 48 into the supply chamber 27, the compression spring 39 being tensioned.

If, during a normal brake application, control of the brake slip control device sets in because its sensors sensed the lock-up of a vehicular wheel, the electromagnetically operable ⅜-way valve 29 will be operated. Thereby the supply reservoir 28 will be separated from the reservoir 8 and will be connected with the booster chamber 13. The auxiliary pressure metered into the booster chamber 13 thereby will reach the supply reservoir 28 and will propagate into the pressure chambers 22, 23 of the master brake cylinder 1 via the supply chambers 26, 27 and the open central valves 24, 25. The pressure increase at the outlet of the ⅜-way valve 29 will cause the throttle valve 50 to switch over into its throttling position. The pressure now prevailing in the supply chamber 27 will pressurize the positioning piston 38 in the brake's release direction and press the same against the butt surface at the annular disk 40. In this way, the positioning piston 38 will prevent the foot pressure F from displacing the booster piston 14 and the secondary cylinder piston 41 too far in the actuating direction and it will be ensured that, in case of a sudden failure of the energy supply during a control operation, a sufficient brake pedal travel will be available for an emergency actuation of the brake. The throttle valve's 50 duty is to attenuate a return movement of the positioning piston 38 up to its abutting against the annular disk 40 is the positioning piston 38 had already been lifted off the annular disk 40 upon the ⅜-way valve's 29 being operated by the booster piston 14. When moving back, the positioning piston 38 will likewise urge back the booster piston 14 and the secondary cylinder piston 41.

What is claimed is:

1. A braking pressure generator for an automotive vehicle hydraulic brake system with a booster piston to actuate a master brake cylinder, said booster piston being pressurizable by an auxiliary hydraulic pressure in a booster chamber, with a pedal actuation device cooperating with the booster piston by way of a valve device for the control of the auxiliary pressure, and with a secondary cylinder chamber communicating with a working chamber of the master brake cylinder, a hydraulically actuatable secondary cylinder piston being movable into said secondary cylinder chamber, wherein, on its side (52) averted from the secondary cylinder chamber (44), the secondary cylinder piston (41) is permanently exposed to the pressure in the booster chamber (13) and wherein, in the brake direction of actuation, the secondary cylinder piston (41) is supported at the booster piston (14).

2. A braking pressure generator as claimed in claim 1, wherein the secondary cylinder chamber (44) is arranged between the booster chamber (13) and the master brake cylinder (1) and wherein the secondary cylinder piston (41) has the form of an annular piston surrounding a connecting rod (20) connecting the booster piston (14) with the master cylinder piston (19).

3. A braking pressure generator as claimed in claim 2, wherein the connecting rod (20) has a stop ring (48) against which, in the brake direction of actuation, a radial butt collar (47) of the secondary cylinder piston (41) may be brought into abutment.

4. A braking pressure generator as claimed in claim 3, wherein, with its annular front face (52), the secondary cylinder piston (41) confines the booster chamber (13) and wherein the booster piston (14) is sealed in the bore of the secondary cylinder piston (41) by means of a slid ring sealing (43).

5. A braking pressure generator as claimed in claim 4, wherein the surface area of the secondary cylinder piston (41) is stepped and forms the secondary cylinder chamber (44) together with a stepped bore in the housing of the brake booster (2).

6. A braking pressure generator as claimed in claim 5, wherein the supply chamber (27) of the master brake cylinder (1) is closed by a positioning piston (38) which annularly surrounds the master cylinder piston's (19) end facing the booster piston (14) and against which, in the brake direction of actuation, the booster piston (14) and the secondary cylinder piston (41) may be brought into abutment.

* * * * *